United States Patent [19]

LaPierre et al.

[11] Patent Number: 4,840,930
[45] Date of Patent: Jun. 20, 1989

[54] METHOD FOR PREPARING ACID STABLE ZEOLITES AND HIGH SILICA ZEOLITES PREPARED BY IT

[75] Inventors: Rene B. LaPierre, Medford; Randall D. Partridge, Ewing; Paul T. Reischman, Lambertville; George T. Kerr, Lawrenceville, all of N.J.

[73] Assignee: Mobil Oil Corporation, New York, N.Y.

[21] Appl. No.: 874,819

[22] Filed: Jun. 12, 1986

Related U.S. Application Data

[63] Continuation of Ser. No. 603,388, Apr. 24, 1984, abandoned, which is a continuation-in-part of Ser. No. 379,424, May 18, 1982, abandoned.

[51] Int. Cl.$^4$ .............................................. B01J 29/08
[52] U.S. Cl. ........................................ 502/79; 502/77; 423/328
[58] Field of Search ............. 423/328, 329; 502/60, 502/77, 79

[56] References Cited

U.S. PATENT DOCUMENTS

| | | | |
|---|---|---|---|
| 3,293,192 | 12/1966 | Maher et al. | 252/430 |
| 3,392,124 | 7/1968 | Laurent | 502/74 |
| 3,493,519 | 2/1970 | Kerr et al. | 423/328 |
| 3,506,400 | 4/1970 | Eberly, Jr. et al. | 423/328 |
| 3,513,108 | 5/1970 | Kerr | 423/328 |
| 3,591,488 | 7/1971 | Eberly, Jr. et al. | 208/111 |
| 3,691,099 | 9/1972 | Young | 252/450 |
| 3,766,093 | 10/1973 | Chu | 252/455 Z |
| 3,937,791 | 2/1976 | Garwood et al. | 423/328 |
| 3,972,983 | 8/1976 | Ciric | 423/328 |
| 4,218,307 | 8/1980 | McDaniel | 208/120 |
| 4,292,166 | 9/1981 | Gorring et al. | 208/59 |
| 4,305,845 | 12/1981 | Tu | 252/455 Z |
| 4,324,696 | 4/1982 | Miale | 502/77 |
| 4,377,468 | 3/1983 | La Pierre et al. | 502/74 |
| 4,384,153 | 5/1983 | Dessau | 585/367 |
| 4,384,161 | 5/1983 | Huang | 585/716 |
| 4,419,218 | 12/1983 | Argeune et al. | 208/89 |
| 4,419,220 | 12/1983 | La Pierre et al. | 208/111 |
| 4,431,746 | 2/1984 | Rollmann | 502/74 |
| 4,481,104 | 11/1984 | Walsh | 208/120 |
| 4,500,417 | 2/1985 | Chen et al. | 208/111 |
| 4,501,926 | 2/1985 | La Pierre et al. | 585/739 |
| 4,503,023 | 3/1985 | Breck | 423/328 |
| 4,512,961 | 4/1985 | Scherzer et al. | 423/328 |
| 4,518,485 | 5/1985 | LaPierre et al. | 208/89 |
| 4,604,373 | 8/1986 | Clark | 502/79 |
| 4,610,856 | 9/1986 | Skeels et al. | 502/79 |
| 4,663,025 | 5/1987 | Fu | 502/79 |
| 4,711,770 | 12/1987 | Skeels et al. | 423/328 |
| 4,745,095 | 5/1988 | Saito et al. | 502/78 |

FOREIGN PATENT DOCUMENTS

| | | | |
|---|---|---|---|
| 0095304 | 5/1983 | European Pat. Off. | 502/64 |
| 0095305 | 11/1983 | European Pat. Off. | 502/79 |
| 1567475 | 4/1970 | Fed. Rep. of Germany | 423/328 |
| 2617571 | 11/1976 | Fed. Rep. of Germany | 208/120 |

OTHER PUBLICATIONS

E. G. Derovane et al., "Physio Chemical Characterization of Zeolite ZSM-20", *Applied Catalysis* 28 (1986), 285–293.

Laszlo Marasi, "Dehydroxylation of Hydrogen Zeolite S: Conditions for the Preparation of Thermally Stable Catalysts", Angew. Chem. Int. Ed. 19, 743–745 (1980).

Julius Scherzer, "Dealuminated Faujasite-Type Structures with $SiO_2/Al_2O_3$ Ratios Over 100", J. Catalysis 54, 285–288 (1978).

*Primary Examiner*—Anthony Mc Farlane
*Attorney, Agent, or Firm*—Alexander J. McKillop; Charles J. Speciale; Marina V. Schneller

[57] ABSTRACT

Zeolite Y and other faujasite type zeolites are made stable to acid by calcination in a steam-containing atmosphere with a slow, controlled heating rate in the temperature range at which chemically bound water in the zeolite is given off, generally from 500° C. to 650° C. The stabilized product may be extracted with acid to produce a zeolite having a higher silica:alumina ratio. The high silica forms of zeolite ZSM-20 which may be produced by this method are novel materials.

6 Claims, No Drawings

METHOD FOR PREPARING ACID STABLE ZEOLITES AND HIGH SILICA ZEOLITES PREPARED BY IT

This is a continuation of copending application Ser. No. 603,388, filed on Apr. 24, 1984, now abandoned, which is a continuation-in-part of application Ser. No. 379,424, filed May 18, 1982, now abandoned.

FIELD OF THE INVENTION

This invention relates to a method for preparing acid stable zeolites, especially zeolites of the faujasite family.

The Prior Art

Zeolites are known materials which have been found to be extremely useful in petroleum refining operations. Of the known types of zeolite, the large pore zeolites typified by the faujastic zeolites have been used extensively for processes such as cracking, hydrocracking, isomerization and alkylation, for example, as described in U.S. Pat. Nos. 4,137,152, 3,804,747. It has been found, however, that although many of these zeolites possess satisfactory activity for these and other reactions, they may be lacking in stability. Zeolite Y which has been used widely for cracking processes is particularly notable in this respect as it has good cracking activity but relatively poor stability and attempts have been made to improve its stability. One form of zeolite Y which is of interest in this respect is the form referred to as "Ultrastable Y" which is described in U.S. Pat. Nos. 3,293,192 and 3,402,996 and which is produced by successively base exchanging a Y type zeolite with ammonium ions and then calcining the zeolite, after which the process of base exchange and calcination is repeated. The sequence of ion exchange and heat treatment results in a shrinkage of the unit cell and this is believed to lead to the high stability of this form of the zeolite. Another process for preparing stabilized forms of type Y zeolites is described in U.S. Pat. No. 4,218,307 and which relies upon the dealuminization of a rare earth exchanged zeolite Y with mineral acid.

It has been observed that the stability of zeolites may be related to their silica:alumina ratio, with the higher ratios leading to greater stability to heat, steam and acid. In view of this, various methods have been proposed for increasing the stability of zeolites by dealuminization—the removal of structural alumina. U.S. Pat. No. 3,591,488 discloses a method for dealuminizing faujasitic zeolites by steaming. U.S. Pat. No. 3,367,884 discloses a process which, like that of U.S. Pat. No. 4,218,307, utilizes an initial prestabilization step prior to contacting the zeolite with acid to remove structural aluminum. Netherlands Pat. No. 6,704,534 also employs an initial prestabilization by steaming.

The reason why these prestabilization steps are employed is that zeolites which initially have a relatively low silica:alumina ratio are unstable to acid: contact with strong mineral acids tends to bring about a collapse of the crystal structure. Although steps may be taken to avoid this collapse, for example, as described in U.S. Pat. No. 3,691,099 by adding additional exchangeable cations to the acid, the problem remains this, that low silica zeolites are relatively unstable to acid and it would be desirable to find some easy way to stabilize them so that a simple acid extraction technique could be used to remove the aluminum and so produce a zeolite having a relatively higher silica:alumina ratio and better thermal stability.

During previous years, proposals have been made for preparing ultrastable zeolite Y by calcination in a deep bed or in the presence of steam, for example, as described in U.S. Pat. No. 3,293,192, where $NH_4$-Y is calcined at high temperatures (700° C.–825° C.) for several hours with a high partial pressure of steam. Another method which is said to result in the formation of ultrastable zeolite Y employs calcination of the ammonium form of the zeolite using a slow heating rate between 500° C. and 600° C.: Angew. Chem. Int. Ed. Engl. 19, 743 (1980). These ultrastable zeolites are not, however, stable during extraction with strong mineral acids and therefore, the problem of producing an acid stable form of the zeolite remains.

A method which did not result in the production of an acid stable zeolite Y is described in the article by Scherzer, J. Catal. 54, 285 (1978). The method, which relied upon the self-steaming of the zeolite in a closed container had the major disadvantage that it could not be used on a larger scale for the commercial production of zeolites because the self-steaming conditions could not be controlled in a larger scale operation.

SUMMARY OF THE INVENTION

It has now been found that faujasitic zeolites, especially zeolite Y, may be made stable to acid by a simple steaming process. The process may be used with zeolites of the faujasite family which have silica:alumina ratios from 3 to 25, for example, zeolite Y or zeolite ZSM-20. The process comprises calcining the zeolite under conditions which control the rate at which the chemically bound water is eliminated; in most of the zeolites used, the chemically bound water tends to come off at temperatures above 400° C. and accordingly, the calcination conditons are controlled at these temperatures. Elimination of the chemically bound water is controlled by calcining the zeolite in a steam-containing atmosphere with a controlled rate of heating in the temperature range in which the water is removed, generally from 500° C. to 650° C. In this range, the heating rate is maintained at a value below 2.5° C. min.$^{-1}$. Once this temperature range has been passed, heating may take place at a faster rate, as desired.

The product of the stabilization treatment is a zeolite which is stable to acid and which may, therefore, be subjected to an acid dealuminization. The dealuminized zeolites produced by the acid extraction have higher silica:alumina ratios than the starting materials; structural silica:alumina ratios of over 100:1 are readily attainable. The highly siliceous forms of zeolite ZSM-20 having structural silica:alumina ratios greater than 10:1 are novel materials.

DESCRIPTION OF THE PREFERRED EMBODIMENTS

The zeolites which may be treated by the present process are members of the faujasite family which have initial silica:alumina ratios from 3:1 to 25:1 (the silica:alumina ratios mentioned in this specification are the framework or structural ratios unless the contrary is stated). The faujasite zeolites are large pore zeolites which are characterized by a double 6-ring as the secondary building unit in their structural frameworks. The unit cells of these zeolites are cubic with a large cell dimension of almost 25 Angstroms and contain 192 (Si, Al)$O_4$ tetrahedra. The aluminosilicate framework consists of a diamond-like array of linked octahedra which are joined tetrahedrally through the 6-rings with the linkage between adjoining truncated octahedra being a double 6 ring or hexagonal prism containing 12 (Si, Al)O$_4$ tetrahedra. The large pore openings which characterize these zeolites are formed by 12 tetrahedral units and have a dimension of about 7.4 Angstroms (based on an X-ray structure determination using an oxygen radius of 1.35 A.)

The zeolite is also selected to have a silica:alumina ratio from 3:1 to 25:1. Conventionally, the silica:alumina ratio of a zeolite is determined by the thermogravimetric analysis (TGA)—ammonia desorption technique and this technique may suitably be applied to determine the silica:alumina ratio of the zeolites used in the present process. It should, however, be understood that if a subsequent dealuminization step is carried out on the stabilized zeolite, the silica:alumina ratio determined by this method may not accurately represent the silica:alumina ratio of the framework because the aluminum removed may become exchanged onto the framework aluminum and so will prevent ammonium ions becoming associated with the framework aluminum during the determination, leading to a low and misleading ammonia tritration. For similar reasons, a chemical analysis may give a misleading high result for the framework silica:alumina ratio because it will include the trapped aluminum in addition to framework aluminum. Other measures of the framework aluminum may therefore be prepared, such as the hexane/water sorption characterstics, indicative of the hydrophobicity of the zeolite.

Zeolites of the faujasite type exhibiting ratios within the specified range of 3:1 to 25:1 include zeolite Y and zeolite ZSM-20. Zeolite Y is a well-known and characterized synthetic zeolite which typically possesses a framework silica:alumina ratio from 3:1 to 6:1, although this ratio may go as high as 25:1. Zeolite ZSM-20 is a synthetic zeolite which has a formula, in the as-synthesized form of

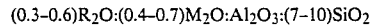

(0.3–0.6)R$_2$O:(0.4–0.7)M$_2$O:Al$_2$O$_3$:(7–10)SiO$_2$ where R is a tetraethylammonium cation and M is an alkali metal cation, especially sodium. In the exchanged form, the formula would be:

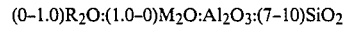

(0–1.0)R$_2$O:(1.0–0)M$_2$O:Al$_2$O$_3$:(7–10)SiO$_2$ where R and M are as before. ZSM-20, together with details of its preparation and utility, is described in U.S. Pat. No. 3,972,983, to which reference is made.

The process is particularly useful with zeolite Y because of the great utility of this zeolite in petroleum refining operations; the ability to prepare forms of this zeolite with higher silica:alumina ratios by a simple stabilization—acid extraction technique is expected to enhance this already notable degree of utility.

It has been found that at temperatures in the initial part of the calcination range of 200° C. to 500° C., a heating rate of greater than 1.6° C. min.$^{-1}$ to less than 5° C. min.$^{-1}$ should be observed. The preferred heating rate is greater than 2.0° C. min.$^{-1}$ to less than 4.0° C. min.$^{-1}$. As shown hereinafter, a heating rate of 2.5° C. min.$^{-1}$ at these temperatures is especially preferred since it provides a steamed zeolite which retains crystallinity after acid extraction. At temperatures in the intermediate range of 500° C. to 650° C. a heating rate of greater than 0° C. to less than 2.5° C. min.$^{-1}$ should be observed and, generally, it is advantageous to maintain the heating rate within the range of 0.2° C. min.$^{-1}$ to less than 2.5° C. min.$^{-1}$. As heating rates increase above 0.5° C. min.$^{-1}$ loss of crystallinity will occur when the steamed zeolite is subject to acid extraction. Steaming at slow heating rates of 0.2° C. min.$^{-1}$ to less than 0.5° C. min.$^{-1}$ within this range is especially preferred since acid stable zeolites can be obtained without the requirement of calcining at high temperatures e.g., 800°·C. At temperatures above 650° C., heating rates of less than 2.5° C. min.$^{-1}$ may generally be used. The use of slow rates at these higher temperatures produces no additional benefit in maintaining the crystallinity of the zeolite. However, if the catalyst is present in large quantities, it may be desirable to maintain a slow rate of heating to higher temperatures e.g., 700° C. or 750° C., in order to obtain satisfactory stabilization.

Because the nature of the zeolite determines its ability to withstand the steaming while still retaining its crystallinity, the steaming conditions should be correllated with the zeolite. For example, the zeolites with higher initial silica:alumina ratios can withstand relatively more severe steaming than those with lower initial ratios and therefore zeolite ZSM-20 will generally be able to withstand a higher water partial pressure in the calcination atmosphere than zeolite Y which usually—but not always—has a lower silica:alumina ratio than ZSM-20. With zeolite Y it will normally not be possible to employ atmospheres consisting completely of steam during the calcination if the crystal structure of the zeolite is to be retained.

The calcination may be completed by heating the zeolite to the final desired temperature, typically 800° C. or even higher e.g. 850° C. or 900° C. At these higher temperatures, conventional calcination procedures may be employed, using atmospheres of steam steam mixed with air or an inert gas. Inert gases such as nitrogen and helium are preferred, either by themselves or mixed with steam. Generally, convenience will dictate that the calcination will be completed using the same atmosphere throughout the process.

Because a limited degree of shrinkage in the unit cell takes place during the calcination, the zeolite should be in a form which permits the structural collapse to take place. For this purpose, the zeolite should be at least partly in the ammonium, hydrogen or rare earth cationic forms, although other cationic forms which also would permit the cell shrinkage are permissible e.g. certain alkaline earth forms or non-oxygenated organic forms such as tetraethylammonium or tetrapropylammonium. Of these, the ammonium-exchanged form is preferred since it will become converted to the hydrogen form during the calcination, the hydrogen form readily allowing the shrinkage to occur. However, rare earth exchanged zeolites such as the lanthamum, cerium, neodymium or samarium exchanged forms, may also be used and of these, the lanthamum and cerium exchanged forms are preferred. The base exchange may be carried out by conventional methods to the degree desired. Successive exchanges may be necessary in order to obtain sufficient exchange into the desired form, especially when making the ammonium-exchanged form. Normally, the zeolite should have at least one half of the exchangeable sites occupied by the cations which will permit the necessary cell shrinkage. Preferably, the content of bulky cations such as lithium should be reduced below 1 percent by appropriate base exchange. If the zeolite in its as-synthesized form has an appropriate cation content for treatment in the present process it may, of course, be used in that form without preliminary base exchange.

After the calcination process is complete, the stabilized zeolite may be subjected to an acid extraction in order to obtain a higher silica:alumina ratio for the zeolite. It has been found that the zeolites retain a high degree of crystallinity, about 50%, during the calcination and that a good proportion of the retained crystallinity will persist during the acid extraction. The extraction is suitably carried out with mineral acids or strong organic acids such as citric acid, trimethylacetic acid or acetic acid but the preferred acid is hydrochloric acid and it may be suitably used in concentrations of 0.1 to 2N, preferably about 0.5 to 1N as crystallinity is retained better with the more dilute acid. Extraction temperatures are usually in the range 20° C. to 100° C. and the extraction is most conveniently carried out by refluxing the stabilized zeolite with the acid. If desired, a complexing agent such as EDTA may be added in order to sequester the aluminum ions as they are removed from the zeolite structure. As an alternative, an additional cation which is exchangeable onto the zeolite may also be provided in the leaching solution, as described in U.S. Pat. No. 3,691,097, to which reference is made for details of this leaching technique, but this expedient will generally not be necessary because the zeolite has sufficient stability to the acid even in the absence of the additional cations.

If desired, the calcination-extraction steps may be repeated in order to obtain a zeolite product which is even higher in silica. Because, as mentioned above, the chemically bound water comes off at higher temperatures with zeolites of a given type with relatively higher silica:alumina ratios, it may be desirable to use the controlled heating rates over a more extended temperature range during the second calcination, although this range may still lie within the 500° C. to 650° C. range which is normally characteristic of the first step. Because the zeolites with the higher silica:alumina ratios also are more stable towards steaming treatments, the severity of the steam calcination may be increased during the second calcination e.g. higher water partial pressures or even heating rates within the critical temperature range may be used. For example, atmospheres containing up to 100 percent steam may be preferred and heating rates may be as high as 1° C. min.$^{-1}$ or even 10° C. min.$^{-1}$ over the critical temperature range which, in this step, may be from 500° C. to 700° C. or even higher e.g. 750° C. However, heating rates of 5° C. min.$^{-1}$ will normally not be exceeded.

The product of the calcination-extraction procedure is a zeolite of the faujasite type having a higher silica:alumina ratio than the starting zeolite. Generally, the silica:alumina ratio of the product zeolites will be at least 30:1 and ratios above 50:1 or, in favorable cases, above 100:1 e.g. above 300:1 or even above 500:1, may be attained. At the same time, the dealuminized zeolite will retain a significant proportion of its original crystallinity e.g. above 30 percent or even above 40 or 50 percent. Products of this kind have not, so far, been available by a convenient and economic procedure of the kind provided by the present process and, especially in the case of zeolite Y, represent products of especial value and interest. The structure of the zeolite will be preserved throughout the process and therefore the final zeolite will have an X-ray diffraction pattern similar to that of the original zeolite although minor changes will be apparent, caused by the changes in unit cell dimension; other properties of the original zeolite will also be retained and therefore the product may find utility in the same applications as the original zeolite e.g. cracking, hydrocracking, isomerization and alkylation.

The highly siliceous forms of zeolite ZSM-20 having silica:alumina ratios greater than 10:1 and usually greater than 20:1 are novel materials. They have, nevertheless, the characteristic three-dimensional crystalline structure of ZSM-20 and are therefore true forms of this zeolite. The structure of ZSM-20 is a hexagonal faujasite structure with pores between 6 and 8 Å in diameter. This structure is manifested by the X-ray diffraction data which are the characteristic indicia of zeolite structure. According to U.S. Pat. No. 3,972,983, the significant lines in the X-ray diffraction pattern are as follows:

TABLE 1

Significant X-ray Data ZSM-20

| D (Å) | Relative Intensity |
|---|---|
| 14.90 ± 0.3 | VS |
| 14.21 ± 0.3 | VS |
| 8.67 ± 0.02 | M |
| 7.44 ± 0.15 | M |
| 5.66 ± 0.10 | S |
| 4.33 ± 0.09 | M |
| 3.83 ± 0.08 | M |
| 3.76 ± 0.07 | S |
| 3.29 ± 0.07 | M |
| 2.90 ± 0.06 | M |
| 2.84 ± 0.06 | M |
| 2.61 ± 0.05 | M |

These data represent the lines of medium or stronger intensity as reported in U.S. Pat. No. 3,972,983. The dealuminized, high silica forms of ZSM-20 exhibit the same characteristic lines although minor shifts in intensity and interplanar spacing may occur with the cationic form of the zeolite, its particular silica:alumina ratio and its previous thermal treatment.

The composition of the dealuminized high-silica zeolite, expressed in terms of the oxide formula is as follows:

$$(0-1.0)R_2O:(1.0-0)M_2O:Al_2O_3:(10)SiO_2$$

where
M is a metallic cation such as Na$^+$, K$^+$, Ca$_{\frac{1}{2}}^+$, Mg$_{\frac{1}{2}}^+$ La$_{\frac{1}{3}}^+$, etc.
R is H or a nitrogenous cation such as NH$_4^+$, (CH$_3$)$_4$N$^+$, (C$_2$H$_5$)$_4$N$^+$, etc.

The silica:alumina ratio of the ZSM-20 may be varied, as described above, by the severity of the acid extraction. Silica:alumina ratios of 20:1, 30:1, 50:1 and 100:1 or even higher, e.g. 250:1, 300:1 or 500:1 may be readily attained, while still retaining a highly crystalline structure. The structural silica:alumina ratio may be varied to a lesser extent by steaming the zeolite either in an atmosphere of pure stream or in steam and another gas, e.g. air or, preferably, nitrogen, although this treatment will leave considerable non-structural aluminum in the zeolite.

The silica:alumina ratios referred to in this specification are the structural or framework ratios, that is the ratio for the SiO$_4$ to the AlO$_4$ tetrahedra which together constitute the structure of which the zeolite is composed. This ratio may vary from the silica:alumina ratio determined by various physical and chemical methods.

For example, a gross chemical analysis may include aluminum which is present in the form of cations associated with the acidic sites on the zeolite, thereby giving a low silica:alumina ratio. Similarly, if the ratio is determined by thermogravimetric analysis (TGA) of ammonia desorption, a low ammonia titration may be obtained if cationic aluminum prevents exchange of the ammonium ions onto the acidic sites. These disparities are particularly troublesome when certain treatments such as the dealuminization methods described below which result in the presence of ionic aluminum free of the zeolite structure are employed. Due care should therefore be taken to ensure that the framework silica:alumina ratio is correctly determined.

The dealuminized zeolite may be treated and used in the same manner as the original zeolite. For example, it may be used in different cationic forms produced by base exchange techniques, as described in U.S. Pat. No. 3,972,983 or composited with a matrix such as a clay or a porous material such as silica-alumina as described in U.S. Pat. No. 3,972,983. The zeolite may be used in reactions such as olefin polymerization, aromatization, cracking and hydrocracking as described in U.S. Pat. No. 3,972,983.

The invention is illustrated by the following Examples:

EXAMPLES 1 AND 2

Two samples of commercially available Ultrastable Y zeolite (USY) (Davidson and Linde) were acid extracted with 0.1N HCl. The Davidson USY sample was treated for 3 hours at 70° C. in 0.1N HCl; the results are shown in Example 1. The Linde USY sample was treated for 1 hour at 85° C. in 0.1N HCl; the results are shown in Example 2, Table 2.

TABLE 2

| Example # | Zeolite | X-ray Crystallinity, %[1] Parent | Acid Treated |
|---|---|---|---|
| 1 | Davidson USY | 100 | 30 |
| 2 | Linde USY | 85 | 22 |

[1]relative to Davidson Ultrastable Y zeolite

These results clearly show that both commercially available Ultrastable Y zeolite samples lose a significant amount of crystallinity on treatment with mild acid.

EXAMPLES 3–5

Samples comprising about 2 gm of NH$_4$NaY zeolite (SiO$_2$/Al$_2$O$_3$ ratio about 5:1; 0.52% Na) were heated in a steam/nitrogen atmosphere produced by bubbling nitrogen at 100 ml/min through water at a temperature of 80°–90° C. The initial heating rates from 200° to 500° C. were varied as shown in Table 3 below, while the final heating rates from 500° to 800° C. were held constant.

TABLE 3

| Example | Heating Rate °C./min 200–500° C. | 500–800° C. | X-ray Crystallinity, %[1] Steamed | Acid Treated[2] |
|---|---|---|---|---|
| 3 | 1.6 | 0.5 | <5 | — |
| 4 | 2.5 | 0.5 | 46 | 51 |
| 5 | 5.0 | 0.5 | 54 | 26 |

[1]relative to Davidson Ultrastable Y zeolite sample.
[2]steamed zeolite acid extracted with 0.1 N HCl for 1 hour at 80–90° C.

The results shown in Table 3, Examples 3–5, clearly show the desirability of maintaining an initial heating rate of about 2.5° C./min. An initial heating rate lower than this resulted in a nearly amorphous material after steaming. Doubling the initial heating rate from 2.5° to 5.0° C./min resulted in a steamed product with acceptable crystallinity. However, this steamed zeolite lost crystallinity following extraction with 0.1N HCl. The steamed zeolite obtained with the intermediate initial heating rate of 2.5° C./min retained crystallinity following the same acid treatment.

EXAMPLES 6–9

Samples comprising about 2 gm of NH$_4$NaY zeolite (SiO$_2$/Al$_2$O$_3$ ratio about 5:1, 0.52% Ni) were heated in a steam/nitrogen atmosphere produced by bubbling nitrogen at 50–100 ml/min through water at a temperature of 80°–95° C. The intermediate heating rates from 500° to 650° C. were varied from 0.20° C./min to 2.5° C./min, while the initial and final rates were held constant at 2.5° C./min from 200° to 500° C. and 650° to 800° C., respectively. The data shown in Table 4 clearly show the desirability of maintaining relatively low intermediate heating rates from 0.20° to less than 2.5° C./min in the 500° to 650° C. temperature range.

TABLE 4

| Example | Heating Rates °C./Min. 200–500 | 500–650 | 750–800 | X-ray Crystallinity %[1] Steamed | Acid Treated[2] |
|---|---|---|---|---|---|
| 6 | 2.5 | 0.20 | 2.5 | 76 | (65)[3] |
| 7 | 2.5 | 0.25 | 2.5 | 63 | 65 |
| 8 | 2.5 | 0.50 | 0.5 | 46 | 51 |
| 9 | 2.5 | 2.50 | 2.5 | 25 | — |

[1]relative to Davidson Ultrastable Y zeolite sample
[2]steamed zeolite acid extracted with 0.1 N HCl for 1 hour at 80–90° C.
[3]estimated from crystallinity following extraction with 2.0 N HCl Increasing the intermediate 500°–650° C. heating rate much above 0.50° C./min results in loss of crystallinity of the steamed zeolite. The steamed products obtained at heating rates of less than 0.5° C./min in the 500°–650° C. range retain a high level of crystallinity even after acid extraction.

EXAMPLE 10

A sample comprising about 2 gm of NH$_4$NaY zeolite (SiO$_2$/Al$_2$O$_3$ ratio about 5:1; 0.52% Na) was heated in a steam/nitrogen atmosphere by bubbling nitrogen at 50 ml/min through water at 95° C. The temperature was increased at 2.5° C./min from 200° to 500° C. and then at a rate of 0.20° C. from 500° to 650° C. at which point the steaming was stopped and the sample cooled. The results are compared with Example 6 in Table 5 below.

TABLE 5

| Example | Heating Rate °C./Min 200–500 | 500–650 | 650–800 | X-ray Crystallinity %[1] Steamed | Acid Treated[2] |
|---|---|---|---|---|---|
| 6 | 2.5 | 0.20 | 2.5 | 76 | (65) |
| 10 | 2.5 | 0.20 | — | 63 | 67 |

[1]relative to Davidson Ultrastable Y zeolite sample
[2]steamed zeolite acid extracted with 0.1 N HCl for 1 hour at 95°

Example 10 clearly shows that an acid stable steamed zeolite was obtained by steaming at the low heating rate of 0.2° C./min from 500°–650° C. without the requirement of heating to the high 800° C. temperature used in Examples 2–9.

EXAMPLE 11

A sample of about 2 gm of NH₄NaY zeolite (SiO₂/Al₂O₃ ratio about 5:1; 0.52% Na) was heated in nitrogen only at 100 ml/min. The heating rates of 2.5° C./min from 200° to 500° C. and 0.20° C. from 500° to 650° C. were identical to those used in Example 10. The product was completely amorphous by X-ray analysis following this treatment. This result clearly indicates the necessity of maintaining a reasonable partial pressure of steam over the sample during calcining in addition to the desirability of maintaining the controlled heating rates as described in the previous examples.

EXAMPLES 12 AND 13

A typical preparation of dealuminized Y zeolite for characterization studies and catalytic evaluation was obtained by employing the controlled steaming conditions described in the previous examples resulting in an acid stable Y zeolite as determined by X-ray analysis. About 2 gms of NH₄NaY zeolite (SiO₂/Al₂O₃ ratio about 5:1; 0.52% Na) was heated in a steam/nitrogen atmosphere obtained by bubbling 100 ml/min nitrogen through water maintained at 92° C. The temperature was increased at 2.5° C. from 200° to 500° C., 0.25° C./min from 500° to 650° C., and 2.5° C./min from 650° to 800° C., at which point the sample was cooled and the steaming stopped. The X-ray crystallinity of this material was 63% relative to the Davidson Ultrastable Y zeolite sample described earlier. Acid extraction of the steamed zeolite with 0.1N HCl for one hour at 80°-90° C. resulted in essentially no crystallinity loss. Ammonium exchange of this material with 1.0M NH₄Cl followed by temperature programmed desorption (TPD) and titration of the evolved ammonia indicated an effective SiO₂/Al₂O₃ ratio of about 91 (Example 12).

TABLE 6

| Example | Acid Normality | X-ray Crystallinity % | SiO₂/Al₂O₃ Ratio |
|---|---|---|---|
| 12 | 0.10 | 65 | 91 |
| 13 | 2.0 | 40 | 309 |

An additional acid extraction of the sample from Example 12 with 2.0N HCl for one hour at 90° C. resulted in a material with 40% crystallinity and an effective SiO₂/Al₂O₃ ratio of 309 as determined by ammonium exchange and TPD analysis (example 13).

EXAMPLE 14

A sample of zeolite ZSM-20 prepared by the method described in U.S. Pat. No. 3,972,983 was ammonium exchanged with 1M NH₄NO₃ solution for 1 hour at 80° C., followed by washing with water. The wasted zeolite with calcined in stream (0.1 atm steam/0.9 atm air) with the temperature increasing at the rate of 0.5° C. min$^{-1}$ from 30° to 200° C. and at the rate of 2.5° C. min.$^{-1}$ from 200° to 550° C. at which temperature it was maintained for 2 hours. The steamed zeolite was then ammonium exchanged with 1M NH₄NO₃ solution for 1 hour at 80° C. and washed with water. The analysis results for this zeolite are shown in Table 7 below:

TABLE 7
ZSM-20 Analysis

| Analysis (Calcined basis) | Wt. % | Wt. % normalized | Mole ratio on Al₂O₃ basis |
|---|---|---|---|
| N | 1.07 | 1.32 | — |
| Na | 0.04 | 0.05 | — |
| Al₂O₃ | 12.43 | 15.31 | 1.00 |
| SiO₂ | 65.31 | 80.42 | 8.91 |
| N₂O | — | — | 0.63 |
| Na₂O | — | — | 0.02 |
| Ash | 82.50 | 82.50 | — |
| TGA Results | | | (repeat) |
| SiO₂/Al₂O₃ - by NH₄⁺ exch. | | | 43.6 (42.4) |
| SiO₂/Al₂O₃ - by NH₃ads. | | | 23.2 (20.7) |
| H₂O sorption gm/100 gm | | | 30.1 |
| n-C₆H₁₄ sorption gm/100 gm | | | 21.1 |

The X-ray diffraction data for this zeolite are shown in Table 8 below.

| LINE NUMBER | 2THETA | D (A) | I/IMAX |
|---|---|---|---|
| 1 | 5.89 | 15.00 | 100 |
| 2 | 6.22 | 14.21 | 99 |
| 3 | 6.53 | 13.53 | 20 |
| 4 | 8.80 | 10.05 | 2 |
| 5 | 10.19 | 8.68 | 87 |
| 6 | 11.05 | 8.01 | 44 |
| 7 | 11.95 | 7.41 | 81 |
| 8 | 15.67 | 5.65 | 92 |
| 9 | 15.95 | 5.56 | 34 |
| 10 | 16.71 | 5.31 | 19 |
| 11 | 17.00 | 5.22 | 5 |
| 12 | 17.19 | 5.16 | 25 |
| 13 | 18.25 | 4.86 | 19 |
| 14 | 18.80 | 4.72 | 35 |
| 15 | 19.70 | 4.51 | 7 |
| 16 | 20.00 | 4.44 | 7 |
| 17 | 20.51 | 4.33 | 76 |
| 18 | 21.50 | 4.13 | 7 |
| 19 | 22.21 | 4.00 | 21 |
| 20 | 22.80 | 3.90 | 20 |
| 21 | 23.39 | 3.80 | 53 |
| 22 | 23.75 | 3.75 | 63 |
| 23 | 24.71 | 3.60 | 15 |
| 24 | 25.14 | 3.54 | 10 |
| 25 | 25.92 | 3.44 | 18 |
| 26 | 26.64 | 3.35 | 16 |
| 27 | 27.23 | 3.27 | 63 |
| 28 | 27.94 | 3.19 | 9 |
| 29 | 28.88 | 3.09 | 14 |
| 30 | 29.80 | 2.998 | 12 |
| 31 | 31.00 | 2.885 | 40 |
| 32 | 31.36 | 2.853 | 38 |
| 33 | 31.60 | 2.831 | 41 |
| 34 | 32.29 | 2.772 | 13 |
| 35 | 32.65 | 2.742 | 15 |
| 36 | 33.31 | 2.690 | 10 |
| 37 | 33.97 | 2.639 | 11 |
| 38 | 34.28 | 2.616 | 13 |
| 39 | 34.62 | 2.591 | 15 |
| 40 | 38.14 | 2.360 | 8 |
| 41 | 39.57 | 2.278 | 3 |
| 42 | 41.76 | 2.163 | 5 |
| 43 | 44.44 | 2.039 | 5 |
| 44 | 48.18 | 1.889 | 5 |
| 45 | 48.38 | 1.882 | 4 |
| 46 | 49.80 | 1.831 | 3 |
| 47 | 49.94 | 1.826 | 3 |
| 48 | 52.93 | 1.730 | 3 |
| 49 | 53.61 | 1.710 | 2 |
| 50 | 54.39 | 1.687 | 5 |
| 51 | 56.26 | 1.635 | 2 |
| 52 | 58.74 | 1.572 | 5 |
| 53 | 58.84 | 1.569 | 6 |

These X-ray data demonstrate that the dealuminized form of the zeolite still possesses the characteristic structure of zeolite ZSM-20: lines numbers 1, 2, 5, 7, 8, 17, 21, 22, 27, 31, 32 and 33 correspond to the significant lines of ZSM-20 as reported in Table 1 above and U.S. Pat. No. 3,972,983.

The ammonium form zeolite (silica:alumina ratio about 42) prepared in this way was calcined in stream (0.1 atm steam, 0.9 atm. air) using a heating rate of 2.5° C. min$^{-1}$ from 30° to 550° C., 0.25° C. min$^{-1}$ from 550° C. to 750° C. after which the zeolite was allowed to cool to 30° C. and then contacted with 0.1N HCl for 1 hour at 80° C. The calcination and acid treatment steps were then repeated followed by treatment with 2.0N HCl at 80° C. for 1 hour. Finally, the extracted zeolite was ammonium exchanged with 1.0M NH$_4$NO$_3$ at 20° C. for 12 hours. The analysis results for this zeolite are shown in Table 9 below.

TABLE 9

Dealuminized ZSM-20 Analysis
Analysis (Calcined basis)

|  | Wt. % | Wt. % normalized | Mole ratio on Al$_2$O$_3$ basis |
|---|---|---|---|
| N | 0.03 | 0.03 | — |
| Na | 0.03 | 0.03 | — |
| Al$_2$O$_3$ | 0.32 | 0.37 | 1.00 |
| SiO$_2$ | 85.99 | 99.43 | 456.1 |
| N$_2$O | — | — | 0.63 |
| Na$_2$O | — | — | 0.40 |
| Ash | 90.66 | 90.66 | — |

TGA Results

| | |
|---|---|
| SiO$_2$/Al$_2$O$_3$ - by NH$_4$$^+$ exch. | 2176 |
| SiO$_2$/Al$_2$O$_3$ - by NH$_3$ ads. | 1085. |
| H$_2$O sorption gm/100 gm | 4.6 |
| n-C$_6$H$_{14}$ sorption gm/100 gm | 21.1 |

The X-ray diffraction data for this form of the zeolite are shown in Table 10 below:

TABLE 10

| LINE NUMBER | 2THETA | D (A) | I/IMAX |
|---|---|---|---|
| 1 | 5.94 | 14.87 | 100 |
| 2 | 6.29 | 14.06 | 81 |
| 3 | 6.65 | 13.30 | 20 |
| 4 | 10.28 | 8.60 | 55 |
| 5 | 11.14 | 7.94 | 26 |
| 6 | 12.06 | 7.34 | 36 |
| 7 | 15.20 | 5.83 | 3 |
| 8 | 15.77 | 5.62 | 35 |
| 9 | 15.95 | 5.56 | 22 |
| 10 | 16.70 | 5.31 | 6 |
| 11 | 17.32 | 5.12 | 10 |
| 12 | 18.40 | 4.82 | 7 |
| 13 | 18.97 | 4.68 | 11 |
| 14 | 19.90 | 4.46 | 4 |
| 15 | 20.67 | 4.30 | 28 |
| 16 | 21.65 | 4.11 | 3 |
| 17 | 22.36 | 3.98 | 5 |
| 18 | 22.97 | 3.87 | 6 |
| 19 | 23.55 | 3.78 | 15 |
| 20 | 23.99 | 3.71 | 15 |
| 21 | 24.89 | 3.58 | 4 |
| 22 | 25.31 | 3.52 | 3 |
| 23 | 26.12 | 3.41 | 4 |
| 24 | 26.65 | 3.34 | 3 |
| 25 | 26.84 | 3.32 | 4 |
| 26 | 27.47 | 3.25 | 17 |
| 27 | 28.96 | 3.08 | 2 |
| 28 | 29.12 | 3.07 | 2 |
| 29 | 30.07 | 2.972 | 2 |
| 30 | 31.25 | 2.862 | 13 |
| 31 | 31.56 | 2.835 | 11 |
| 32 | 31.92 | 2.804 | 11 |
| 33 | 32.50 | 2.755 | 3 |
| 34 | 32.99 | 2.715 | 3 |
| 35 | 33.57 | 2.670 | 1 |
| 36 | 34.53 | 2.597 | 3 |
| 37 | 34.91 | 2.570 | 4 |
| 38 | 38.48 | 2.339 | 3 |
| 39 | 39.79 | 2.265 | 2 |
| 40 | 42.06 | 2.148 | 2 |
| 41 | 44.76 | 2.025 | 2 |
| 42 | 48.63 | 1.872 | 2 |
| 43 | 48.80 | 1.866 | 1 |
| 44 | 50.25 | 1.816 | 1 |
| 45 | 53.33 | 1.718 | 1 |
| 46 | 54.14 | 1.694 | 1 |
| 47 | 54.88 | 1.673 | 2 |
| 48 | 56.70 | 1.623 | 2 |
| 49 | 59.25 | 1.560 | 2 |
| 50 | 59.39 | 1.556 | 3 |

These X-ray data demonstrate that the dealuminized form of the zeolite still possesses the characteristic structure of zeolite ZSM-20: lines numbers 1, 2, 4, 6, 8, 15, 19, 20, 26, 30, 31 and 32 correspond to the significant lines of ZSM-20 as reported in Table 1 above and U.S. Pat. No. 3,972,983. The X-ray data for the steam and acid dealuminized samples show, moreover, that no significant crystallinity loss has occurred on dealuminization since the high angle (2 theta greater than 20°) peaks are of the same intensity in the original spectra. The nearly identical hydrocarbon sorption values also indicate that no significant crystallinity loss has occurred during dealuminization.

What is claimed is:

1. A process for making an acid stabilized zeolite having the structure of a faujasite which comprises calcining a zeolite having the structure of a faujasite in a steam-containing atmosphere comprising at least 10 weight percent steam at increasing temperatures extending over the temperature range of 200° C. to 650° C. wherein the zeolite is heated at a rate greater than 2.0° C. min.$^{-1}$ and less than 4.0° C. min.$^{-1}$ within the range of 200° C. to 500° C. and 0.2° C. to 0.5° C. min.$^{-1}$ within the range of 500° C. to 650° C.; cooling the calcined zeolite; and contacting the cooled calcined zeolite with an acid to remove structural aluminum from the zeolite, to raise the silica:alumina ratio of the zeolite.

2. A process according to claim 1 in which the steam-containing atmosphere comprises 10 to 20 weight percent steam.

3. A process according to claim 1 in which the steam-containing atmosphere comprises steam and nitrogen.

4. A method of making zeolite Y having a silica:alumina ratio of at least 30:1, which comprises the steps of:
   (i) calcining a sample of zeolite Y starting material having a silica:alumina ratio from 3:1 to 25:1 in a steam-containing atmosphere at a temperature of 200° C. to 650° C., wherein the zeolite is heated at a rate greater than 2.0° C. min.$^{-1}$ and less than 4.0° C. min.$^{-1}$ within the range of 200° C. to 500° C. and 0.2° C. to 0.5° C. min.$^{-1}$ within the range of 500° C. to 650° C.,
   (ii) maintaining the heating rate during the calcination,
   (iii) cooling the calcined zeolite,
   (iv) contacting the cooled, calcined zeolite with an acid to remove structural aluminum from the zeolite and so to raise the silica:alumina ratio of the zeolite to at least 30:1.

5. A method according to claim 4 in which the acid is hydrochloric acid.

6. A method of preparing zeolite ZSM-20 having a silica:alumina ratio greater than 10 which comprises calcining zeolite ZSM-20 having a silica:alumina ratio of from 7:1 to 10:1 in a steam-containing atmosphere at increasing temperatures over a range of 200° C. to 650° C. wherein the zeolite is heated at a rate greater than 2.0° C. min.$^{-1}$ to less than 4.0° C. min.$^{-1}$ over a temperature of 200° C. to 500° C. and at a rate of 0.2° to 0.5° C. min.$^{-1}$ over a temperature of 500° C. to 650° C. and contacting the calcined zeolite with acid to extract structural aluminum from the zeolite to raise the structural silica:alumina ratio to a value greater than 10:1.

* * * * *